(12) United States Patent
Tucker

(10) Patent No.: US 9,963,244 B2
(45) Date of Patent: *May 8, 2018

(54) TASK-BASED HEALTH DATA MONITORING OF AIRCRAFT COMPONENTS

(71) Applicant: Bell Helicopter Textron Inc., Fort Worth, TX (US)

(72) Inventor: Brian Edward Tucker, Fort Worth, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/636,544

(22) Filed: Jun. 28, 2017

(65) Prior Publication Data

US 2017/0320590 A1    Nov. 9, 2017

Related U.S. Application Data

(63) Continuation of application No. 15/149,974, filed on May 9, 2016, now Pat. No. 9,701,420.

(51) Int. Cl.
*B64D 45/00* (2006.01)
*G07C 5/08* (2006.01)
*G07C 5/00* (2006.01)

(52) U.S. Cl.
CPC ............. *B64D 45/00* (2013.01); *G07C 5/006* (2013.01); *G07C 5/008* (2013.01); *G07C 5/085* (2013.01); *B64D 2045/0085* (2013.01)

(58) Field of Classification Search
CPC ........ B64D 45/00; G07C 5/002; G07C 5/816; G07C 5/0841

See application file for complete search history.

(56) References Cited

U.S. PATENT DOCUMENTS 5,581,664 A    12/1996 Allen et al.
6,738,748 B2    5/2004 Wetzer
(Continued)

FOREIGN PATENT DOCUMENTS

EP    2597602 A1    5/2013
EP    2760001 A1    7/2014
WO    2015195184 A2    12/2015

OTHER PUBLICATIONS

European Examination Report; Application No. 16172865.4; European Patent Office; dated Mar. 8, 2017.
(Continued)

*Primary Examiner* — Anne M Antonucci
(74) *Attorney, Agent, or Firm* — Lawrence Youst PLLC

(57) ABSTRACT

Systems, methods and non-transitory computer readable storage medium are provided for task-based health data monitoring relating to aircraft components of aircraft within an aircraft fleet. One method includes establishing a review item with a first data review state to create a review task relating to health data of an aircraft component, generating images relating to the review item for display on a display device, retaining the review item for monitoring responsive to receiving user input changing the first data review state of the review item to a second data review state, receiving new health data relating to the aircraft component and automatically resetting the review item from the second data review state to the first data review state responsive to receiving the new health data to create a new review task.

19 Claims, 8 Drawing Sheets

(56) References Cited

U.S. PATENT DOCUMENTS

| | | |
|---|---|---|
| 7,103,610 B2 | 9/2006 | Johnson et al. |
| 7,983,809 B2 | 7/2011 | Kell et al. |
| 7,984,146 B2 | 7/2011 | Rozak et al. |
| 9,096,327 B2 | 8/2015 | Tucker et al. |
| 2002/0143421 A1 | 10/2002 | Wetzer |
| 2007/0260726 A1* | 11/2007 | Rozak ............... G06Q 10/06 709/224 |
| 2009/0083050 A1* | 3/2009 | Eltman ............... G06Q 10/20 705/305 |
| 2016/0052640 A1* | 2/2016 | Buehler ............... B64D 45/00 340/945 |

OTHER PUBLICATIONS

European Search Report; Application No. 16172865.4; European Patent Office; dated Feb. 2, 2017.

* cited by examiner

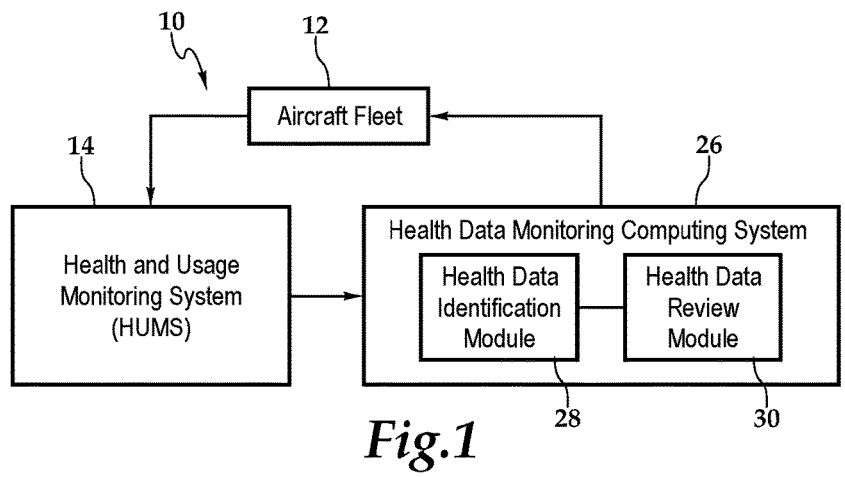
*Fig.1*
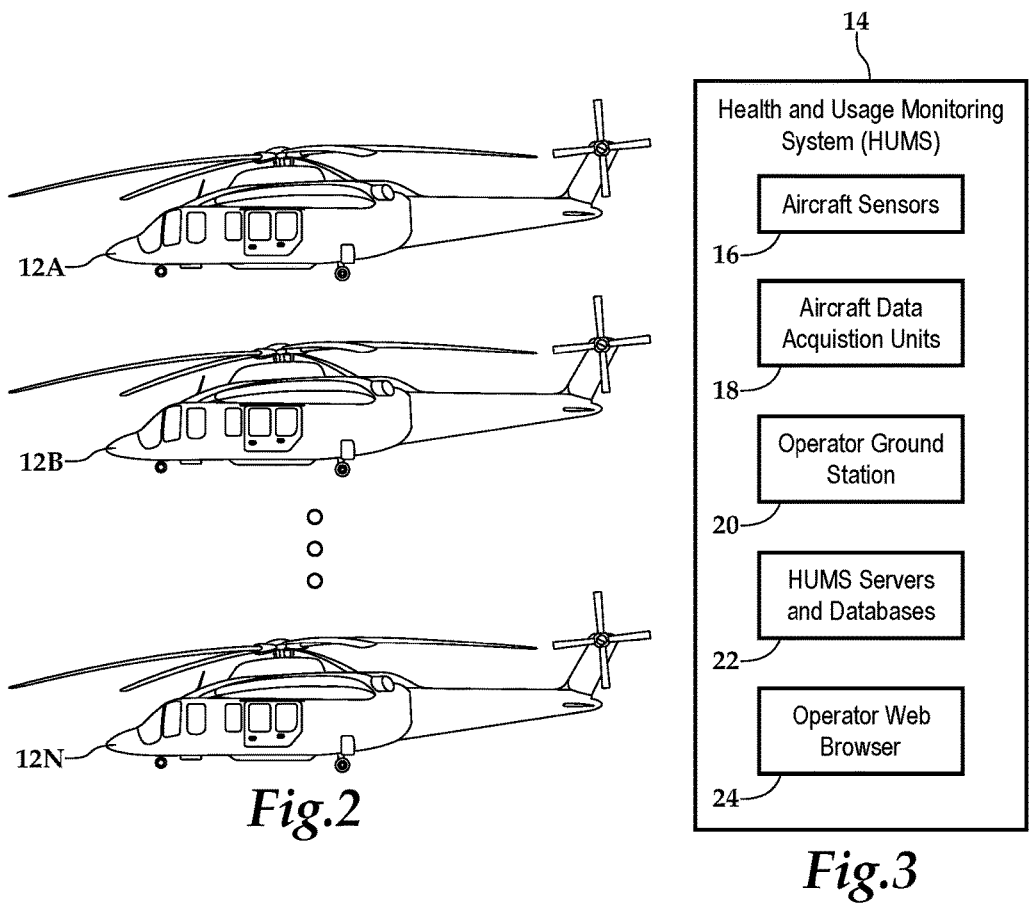
*Fig.2*  *Fig.3*

```
Fault History for Component - HUMS

Aircraft 10125 (Fleet 2 Aircraft)
    Component Tail Rotor

Fault                      Date      Mode     Status
Tail Rotor Pitch Variation  Day 14    Normal    ⊗
Tail Rotor Imbalance        Day 14    Normal    ⓘ
Tail Rotor High Harmonics   Day 14    Normal    ⓘ
```

TASK-BASED HEALTH DATA MONITORING OF AIRCRAFT COMPONENTS

CROSS-REFERENCE TO RELATED APPLICATIONS

This is a continuation of application Ser. No. 15/149,974 filed May 9, 2016, now U.S. Pat. No. 9,701,420.

TECHNICAL FIELD OF THE DISCLOSURE

The present disclosure relates, in general, to aircraft health and usage monitoring and, in particular, to a task-based health data monitoring system for reviewing data relating to the health of monitored aircraft components within an aircraft fleet.

BACKGROUND

An aircraft, such as a helicopter, has many critical components that are required to operate properly in order to achieve flight safety. In the past, monitoring of these critical components was performed through manual inspection, for example, before and after flights. These manual inspections, however, were inefficient and in many cases, insufficient to predict a critical component failure. To overcome some of the limitations of manual inspections, Health and Usage Monitoring Systems (HUMS) have been installed on many aircraft. The use of HUMS have not only resulted in improvements in aircraft safety but have also increased operational readiness of entire aircraft fleets by enabling operators to proactively identify and correct defects as well as minimize unscheduled maintenance and logistics cost.

A typical HUMS includes numerous sensors, such as accelerometers, that are placed on critical components of an aircraft such as the aircraft's engine and drive system. The sensors gather data relating to parameters of the monitored components and provide the data to one or more on-board data acquisition units. The data is then transferred from the data acquisition units to a ground station and other computer systems for operator analysis. As an example, if a helicopter experiences a relatively high tail rotor drive shaft torque loading over a certain period of time, vibratory irregularities or deflection anomalies, the HUMS acquires the relevant data from the sensors for operator analysis such that timely inspection and/or maintenance of bearings or other aircraft systems can be performed. While HUMS have greatly improved the overall safety records of aircraft employing this technology, it has been found that due to the significant volume of data gathered and processed by HUMS for aircraft fleets, important data relating to specific aircraft components of a particular aircraft within a fleet may sometimes be missed or overlooked by operators.

SUMMARY

In a first aspect, the present disclosure is directed to a method of task-based health data monitoring relating to aircraft components of aircraft within an aircraft fleet. The method includes identifying health data of an aircraft component for potential monitoring based upon a condition indicator provided by a health and usage monitoring system; establishing a Review Item for the health data of the aircraft component wherein the Review Item has an initial data review state of New Data, thereby creating a Review Task; generating images of the Review Item for display on a display device and receiving an indication to change the data review state of the Review Item from New Data to Watch Data; receiving new health data relating to the aircraft component from the health and usage monitoring system; and automatically resetting the data review state of the Review Item from Watch Data to New Data responsive to the receipt of the new health data, thereby creating a new Review Task.

The method may also include compiling health and usage monitoring system data for the aircraft fleet; displaying the condition indicator on the display device and receiving a user selection to establish the Review Item for the health data of the aircraft component; automatically identifying that the condition indicator for the aircraft component has deviated from a desired level; determining the condition indicator has an undesired indicator trend selected from the group consisting of rate of change, step change, data spike and change in scatter; generating a maintenance request for the aircraft component; closing the Review Item; generating a case study relating to the aircraft component; generating a report relating to the aircraft component; assigning a closing category to the Review Item and/or using closing category data to determine the validity of condition indicators provided by the health and usage monitoring system.

In a second aspect, the present disclosure is directed to a system for task-based health data monitoring relating to aircraft components of aircraft within an aircraft fleet. The system includes a health data monitoring computing system having logic stored within a non-transitory computer readable medium that is executable by a processor. The health data monitoring computer system is configured to identify health data of an aircraft component for potential monitoring based upon a condition indicator provided by a health and usage monitoring system; establish a Review Item for the health data of the aircraft component wherein the Review Item has an initial data review state of New Data, thereby creating a Review Task; generate images of the Review Item for display on a display device and receive an indication to change the data review state of the Review Item from New Data to Watch Data; receive new health data relating to the aircraft component from the health and usage monitoring system; and automatically reset the data review state of the Review Item from Watch Data to New Data responsive to the receipt of the new health data, thereby creating a new Review Task.

In a third aspect, the present disclosure is directed to a non-transitory computer readable storage medium comprising a set of computer instructions executable by a processor for operating a health data monitoring computing system. The computer instructions are configured to identify health data of an aircraft component for potential monitoring based upon a condition indicator provided by a health and usage monitoring system; establish a Review Item for the health data of the aircraft component wherein the Review Item has an initial data review state of New Data, thereby creating a Review Task; generate images of the Review Item for display on a display device and receive an indication to change the data review state of the Review Item from New Data to Watch Data; receive new health data relating to the aircraft component from the health and usage monitoring system; and automatically reset the data review state of the Review Item from Watch Data to New Data responsive to the receipt of the new health data, thereby creating a new Review Task.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which:

FIG. 1 is a flow diagram of a task-based health data monitoring system for aircraft components of aircraft within an aircraft fleet in accordance with embodiments of the present disclosure;

FIG. 2 is a schematic illustration of an aircraft fleet in accordance with embodiments of the present disclosure;

FIG. 3 is a schematic illustration of a Health and Usage Monitoring System (HUMS) in accordance with embodiments of the present disclosure;

DETAILED DESCRIPTION

Figure 4A:
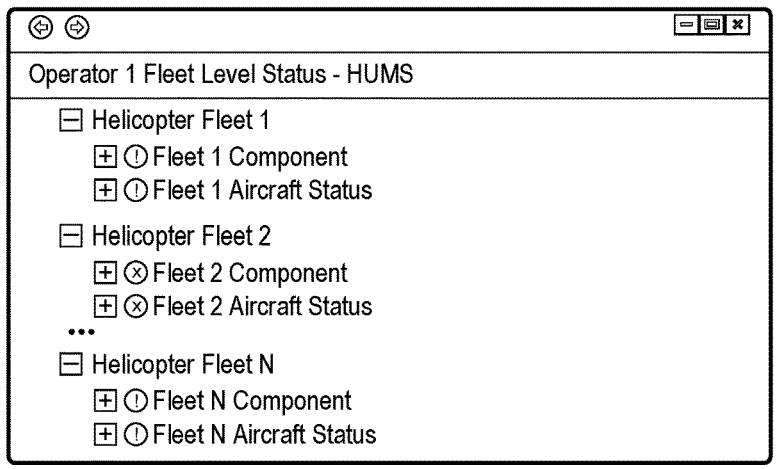
FIGS. 4A-4E are webpages presented by a HUMS server displaying condition indicator data relating to aircraft components of aircraft within an aircraft fleet in accordance with embodiments of the present disclosure.

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, not all features of an actual implementation may be described in the present disclosure. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would be a routine undertaking for those of ordinary skill in the art having the benefit of this disclosure.

Referring to FIG. 1 in the drawings, a flow diagram representing systems and methods for task-based health data monitoring of aircraft components of aircraft within an aircraft fleet is generally designated 10. The systems and methods described herein provide a mechanism for identifying health issues relating to critical components of an aircraft and for monitoring health data trends associated with the critical components to efficiently and proactively correct defects, thereby improving aircraft safety. While the systems and methods of the present disclosure may be used in association with a single aircraft, the greatest efficiency gains are seen when the systems and methods described herein are implemented on a fleet level as indicated in block 12. As best seen in FIG. 2, aircraft fleet 12 may comprise any number of aircraft such as helicopters 12A-12N. Aircraft fleet 12 may include only a single model of aircraft, such as Bell 525 helicopters or may include numerous aircraft models such as Bell 525 helicopters, Bell 212 helicopters, Bell 429 helicopters and the like, in which case each model could be considered its own aircraft fleet or a sub-fleet within aircraft fleet 12.

A health and usage monitoring system (HUMS) 14 is associated with aircraft fleet 12 to acquire, analyze, communicate and store data gathered from sensors and accelerometers that monitor essential components of each aircraft. More specifically, as best seen in FIG. 3, HUMS 14 may include hundreds of sensors 16 that are embedded on-board each aircraft in critical locations including the aircraft's engine and drive system to monitor a variety of parameters including, for example, vibration. The data obtained by sensors 16 is typically in an analog format and is sent to one or more on-board data acquisition units 18 that may convert the data into a digital format. The data from the data acquisition units 18 is transferred to a fixed or mobile ground station 20, typically after each flight, using wired or wireless communication techniques including, but is not limited to, hardwire cabling such as parallel cables, serial cables, USB cables, Firewire cables or the like or wireless protocols such as Bluetooth connectivity, infrared connectivity, radio transmission connectivity, Wi-Fi connectivity or other suitable communications protocol. Alternatively, data may be transferred from data acquisition units 18 to ground station 20 using a physical media such as CompactFlash cards, Memory Sticks, SmartMedia cards, MultiMediaCards (MMC), Secure Digital (SD) memory or other suitable memory storage entity.

Ground station 20 may be a general purpose computer, a special purpose computer or other machine with memory and processing capability. For example, ground station 20 may include one or more memory storage modules including, but is not limited to, internal storage memory such as random access memory (RAM), non-volatile memory such as read only memory (ROM), removable memory such as magnetic storage memory, optical storage memory including CD and DVD media, solid-state storage memory including CompactFlash cards, Memory Sticks, SmartMedia cards, MultiMediaCards (MMC), Secure Digital (SD) memory or other suitable memory storage entity. Ground station 20 may be a microprocessor-based system operable to execute program code in the form of machine-executable instructions. While certain operations and analysis may be performed using ground station 20 and/or other local computing systems, the acquired data is preferably uploaded to HUMS servers and databases 22. Communication between ground station 20 and HUMS servers and databases 22 may occur over a proprietary encrypted network, a public encrypted network, the Internet or other suitable communication connections and may include both wired and wireless connections.

HUMS servers and databases 22 may include one or more HUMS databases having suitable database structural types, such as, relational, hierarchical, network, flat or object relational. The HUMS database may be configured to store aircraft fleet information, aircraft information, aircraft component information and related information for one or more aircraft fleet operators. HUMS servers and databases 22 may also include one or more HUMS server computing systems such as one or more networked computer servers each preferably having memory and processing capability. For example, the HUMS servers may be microprocessor-based systems operable to execute computer software stored thereon in the form of machine-executable instructions to receive and process HUMS information from one or more ground stations 20 and to manage, access and display HUMS information stored in the HUMS database. It is to be understood that the various modules of the HUMS servers may be implemented in a variety of forms including hardware, software, firmware, special purpose processors and combinations thereof.

A fleet operator may use an operator web browser 24 to access the HUMS information relating to that operator's aircraft fleet, such as aircraft fleet 12. Operator web browser 24 may be implemented on a general purpose computer, a special purpose computer or other machine with memory and processing capability and preferably on a microprocessor-based computer system operable to communicate with HUMS servers and databases 22. For example, operator web browser 24 and HUMS servers and databases 22 may be connected via a communication network using hardwired and/or wireless connections. The communication network may be a local area network (LAN), wide area network (WAN), the Internet, or any other type of network that couples a plurality of computers to enable various modes of communication via network messages using as suitable communication technique, such as Transmission Control Protocol/Internet Protocol (TCP/IP), File Transfer Protocol (FTP), Hypertext Transfer Protocol (HTTP), Internet Protocol Security Protocol (IPSec), Point-to-Point Tunneling Protocol (PPTP), Secure Sockets Layer (SSL) Protocol or other suitable protocol.

Operator web browser 24 preferably includes a display device configured to display a graphical user interface generated by HUMS servers and databases 22. The display device may be configured in any suitable form, including, for example, Liquid Crystal Displays (LCD), Light emitting diode displays (LED), Cathode Ray Tube Displays (CRT) or any suitable type of display. Operator web browser 24 and/or the display device may also include an audio output device such as speakers or an audio port allowing the user to hear audio output. The display device may also serve as a user interface device if a touch screen display implementation is used. Other user interface devices associated with operator web browser 24 may include a keyboard and mouse, a keypad, a touch pad, a video camera, a microphone and the like to allow a data analyst to interact with operator web browser 24 and HUMS servers and databases 22.

In one non-limiting example, a data analyst using operator web browser 24 to access HUMS information on aircraft fleet 12 from HUMS servers and databases 22 may be presented with information in the form of webpages. As best seen in FIG. 4A, the data analyst has accessed Fleet Level Status information associated with Operator 1. As illustrated, aircraft fleet 12 of Operator 1 includes numerous sub-fleets denoted as Helicopter Fleet 1, Helicopter Fleet 2 and Helicopter Fleet N, wherein each sub-fleet represents a particular model of helicopter such as Bell 525 helicopters, Bell 212 helicopters, Bell 429 helicopters and the like. In the illustrated example, Helicopter Fleet 2 has at least one component of at least one aircraft that has a condition indicator in an alert state, referred to herein as a critical condition indicator, associated therewith as depicted using the x-icons in front of Fleet 2 Component and Fleet 2 Aircraft Status. It should be noted that when a specific component has a critical condition indicator, the aircraft including that component will also have a critical condition indicator. Likewise, when a specific aircraft has a critical condition indicator, the fleet including that aircraft will also have a critical condition indicator. As such, when a data analyst sees a fleet level critical condition indicator, this means that at least one aircraft in the fleet has a component in an alert state.

Figure 4B:
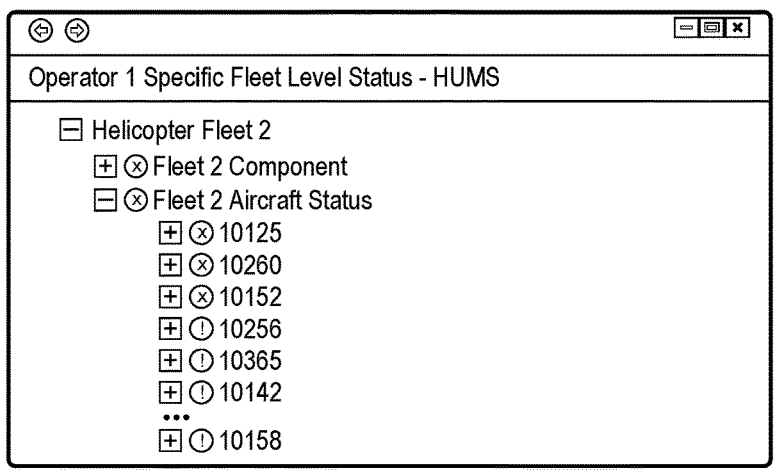
Figure 4C:
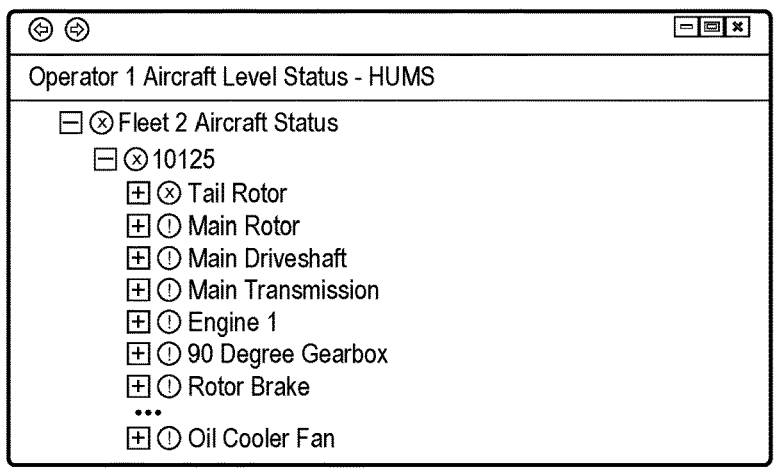

In the present example, the data analyst expands Fleet 2 Aircraft Status in FIG. 4B to further investigate the critical condition indicator and identify the specific aircraft with one or more components in an alert state. As illustrated, Helicopter Fleet 2 includes numerous aircraft denoted by tail numbers, such as Aircraft 10125, 10260 and 10152. In the illustrated example, at least one component in each of Aircraft 10125, 10260 and 10152 has a critical condition indicator associated therewith as depicted using the x-icons in front of the tail numbers of these aircraft. The data analyst expands Aircraft 10125 in FIG. 4C to further investigate the critical condition indicator associated therewith and identify the specific component or components in an alert state. As illustrated, Aircraft 10125 includes numerous components such as Tail Rotor, Main Rotor and Main Driveshaft to name a few. In the illustrated example, the Tail Rotor component has a critical condition indicator associated therewith as depict using the x-icon in front of the Tail Rotor item in the list.

Figures 4D, 4E:
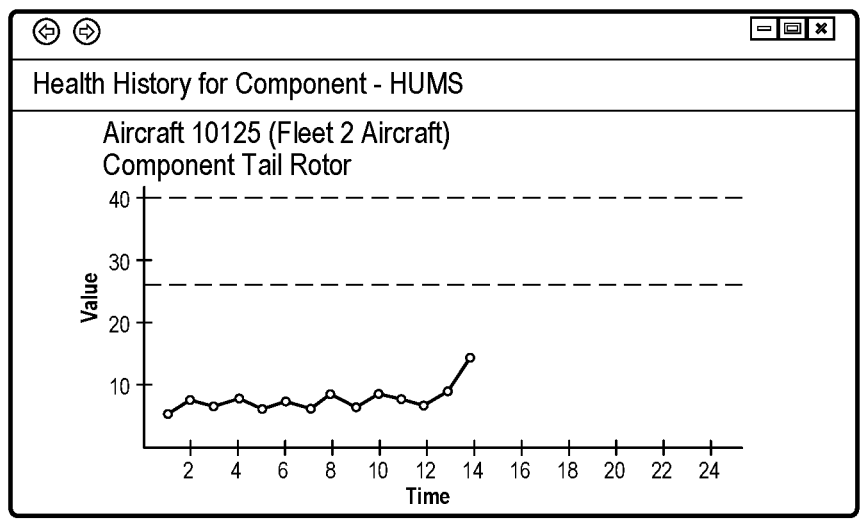

Now that the data analyst has identified the specific component having the critical condition indicator, the analyst can launch addition HUMS data tools to further investigate the critical condition associated with the Helicopter Fleet 2, Aircraft 10125, Tail Rotor component. For example, as best seen in FIG. 4D, the data analyst has launched a HUMS Fault History for Component page showing the specific fault the HUMS sensors identified in the previous flight of Aircraft 10125; namely, Tail Rotor Pitch Variation fault as indicated by the x-icon following this fault item. In addition, as best seen in FIG. 4E, the data analyst has launched a HUMS Health History for Component page showing data relating to Tail Rotor Pitch Variation for Aircraft 10125 over a previous time period enabling the data analyst to identify any health data trends of interest. As illustrated, Tail Rotor Pitch Variation for Aircraft 10125 has data points for Days 1-12 that are relatively stable and within a desired range. Data points for Days 13 and 14, however, are increasing in value, which represents negatively trending data relating to Tail Rotor Pitch Variation for Aircraft 10125. It is noted that while the data is trending negatively, the data points have not exceeded either the lower threshold at approximately Value 26 or the upper threshold at approximately Value 40.

In this example, the data analyst for aircraft fleet 12 must now determine whether inspection, maintenance or other activity should take place relating to the Tail Rotor Pitch Variation for Aircraft 10125 based upon the critical condition indicator identified using the HUMS. If the data analyst decides to take no action, for example, because the condition indicator has not exceeded the lower threshold, current HUMS do not provide a way for the data analyst to subsequently reengage with the health data relating to Tail Rotor Pitch Variation for Aircraft 10125 without drilling down through the menu tree as described above. For example, it may be prudent for the data analyst to reassess the decision to take no action after Aircraft 10125 has logged additional flight time, however, current HUMS do not provide a way for the data analyst to know when new health data relating to the Tail Rotor Pitch Variation for Aircraft 10125 is available without drilling down through the menu tree as described above. In addition, while a single critical condition indicator relating to a single component of a single aircraft within aircraft fleet 12 has been discussed in this example, in real world aircraft fleets, HUMS data would be generated from hundreds of aircraft each having hundred or thousands of condition indicators any one or more of which may require data analyst review. Due to the significant volume of information provided by HUMS, negatively trending data that has not exceeded a particular threshold may tend to get overlooked.

Referring again to FIG. 1, using the health data monitoring computing system 26 disclosed herein, negatively trending data relating to an aircraft component such as that in the example presented above, can be identifying for potential monitoring, established as a Review Item associated with a Review Task and continuously monitored as new health data relating to the aircraft component becomes available. In other words, once a Review Item is established, the data analyst is able to efficiently monitor data trends to enable the data analyst to make more highly informed decisions regarding proactive inspection or maintenance relating to aircraft components or making requests to the OEM or engineering department relating to aircraft components. Health data monitoring computing system 26 may be implemented on one or more general purpose computers, special purpose computers or other machines with memory and processing capability and preferably on a microprocessor-based computer system operable to communicate with HUMS servers and databases 22 over a communication network using hardwired and/or wireless connections and a suitable communication protocol. Health data monitoring computing system 26 preferably includes a display device configured to display a graphical user interface and utilizes interface devices such as a keyboard and mouse, a touch screen display, a keypad, a touch pad, a video camera, a microphone and the like to allow a data analyst to interact with health data monitoring computing system 26.

Health data monitoring computing system 26 preferably includes a non-transitory computer readable storage medium including a set of computer instructions executable by a processor for task-based health data monitoring relating to aircraft components of aircraft within an aircraft fleet. In the illustrated embodiment, the computer instructions include a health data identification module 28 and a health data review module 30. It is to be understood that these and other modules of health data monitoring computing system 26 may be implemented in a variety of forms including hardware, software, firmware, special purpose processors and combinations thereof. Health data identification module 28 uses manual or automated techniques to determine which condition indicators relating to an aircraft component should become candidates for further monitoring. For example, in a manual process, once a data analyst has reviewed the HUMS Fault History for Component page depicted in FIG. 4D and/or the HUMS Health History for Component page depicted in FIG. 4E, the data analyst may submit the health data for Tail Rotor Pitch Variation for Aircraft 10125 as a candidate for further monitoring due to the negatively trending data. Alternatively or additionally, health data identification module 28 may use one or more data modeling algorithms or other suitable algorithms to identify data trends that may warrant submission of health data relating to a particular aircraft component as a candidate for further monitoring. For example, the algorithms may search the HUMS data for condition indicators having rate of change data trends, step change data trends, data spike data trends, change in scatter data trends and the like.

After health data of the aircraft component has been identified as a candidate for further monitoring, this information is passed to health data review module 30. A data analyst may then accept the candidate, in which case the health data of the aircraft component becomes a Review Item within health data review module 30. The Review Item generates a Review Task for the data analyst each time new health data relating to the aircraft component is received, for example, after each subsequent flight of Aircraft 10125. In addition, Review Item data is displayed by health data review module 30 in such a matter as to allow the data analyst to easily distinguish between previously reviewed data and new data. Health data review module 30 also enables the data analyst to request maintenance and/or OEM support and to monitor the results of such actions as new HUMS data is received.

Figure 5:
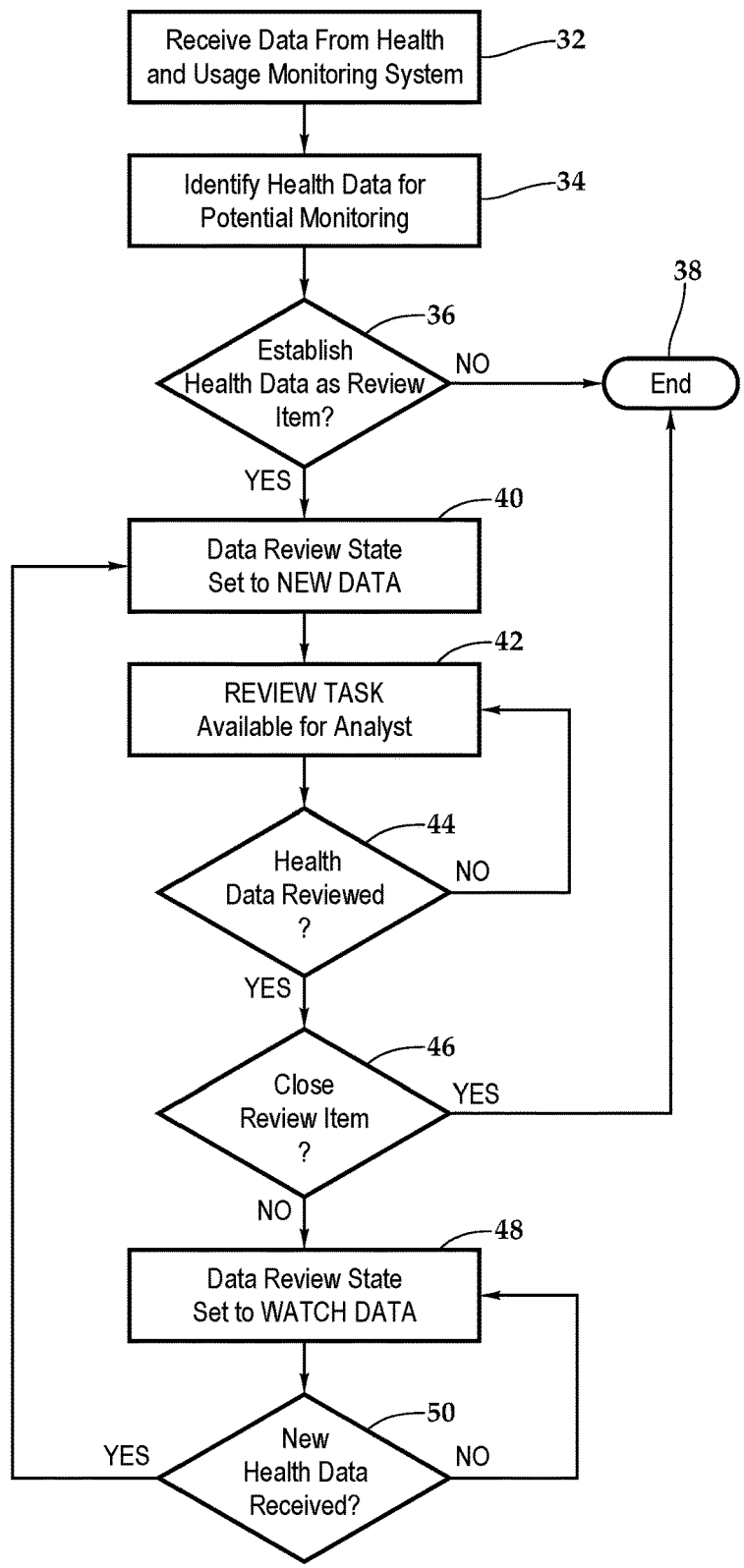
FIG. 5 is a flow diagram of a process of task-based health data monitoring relating to aircraft components of aircraft within an aircraft fleet in accordance with embodiments of the present disclosure.

Referring next to FIG. 5 of the drawings, one embodiment of a process of task-based health data monitoring relating to aircraft components of aircraft within an aircraft fleet will now be described. Health data monitoring computing system 26 receives data from health and usage monitoring system 14, as indicated in block 32. Health data monitoring computing system 26 may requests access to the HUMS data relating to the entire aircraft fleet 12, a sub-fleet within aircraft fleet 12, a particular aircraft within aircraft fleet 12, a particular component of an aircraft within aircraft fleet 12 or other suitable data set within a specified time period. In the present example, health data monitoring computing system 26 requests access to the HUMS data relating to the entire aircraft fleet 12 received within the past 24 hours. This HUMS data is processed in health data identification module 28 using one or more data modeling algorithms or other suitable algorithms to identify negatively trending condition indicators having, for example, rate of change data trends, step change data trends, data spike data trends or change in scatter data trends to identify health data for potential monitoring, as indicated in block 34. Alternatively or additionally, a data analyst reviewing the retrieved HUMS data may manually identify candidates for potential monitoring based upon similar criteria.

Once candidates have been identified for potential monitoring in health data identification module 28, this information is now available in health data review module 30. The next process step involves determining whether to promote the identified candidate for potential monitoring to a Review Item according to decision block 36. If the data analyst does not believe the identified health data of the aircraft component should be promoted to a Review Item, the process relating to the identified candidate for potential monitoring is complete, as indicated by end block 38. If the data analyst believes the identified health data of the aircraft component should be promoted to a Review Item, then health data review module 30 establishes the identified candidate for potential monitoring as a Review Item, as determined in decision block 36. The process moves forward to block 40 where the Review Item is given an initial data review state of New Data and health data review module 30 generates a Review Task, which is available for a data analyst, as indicated in block 42.

Figure 6A:
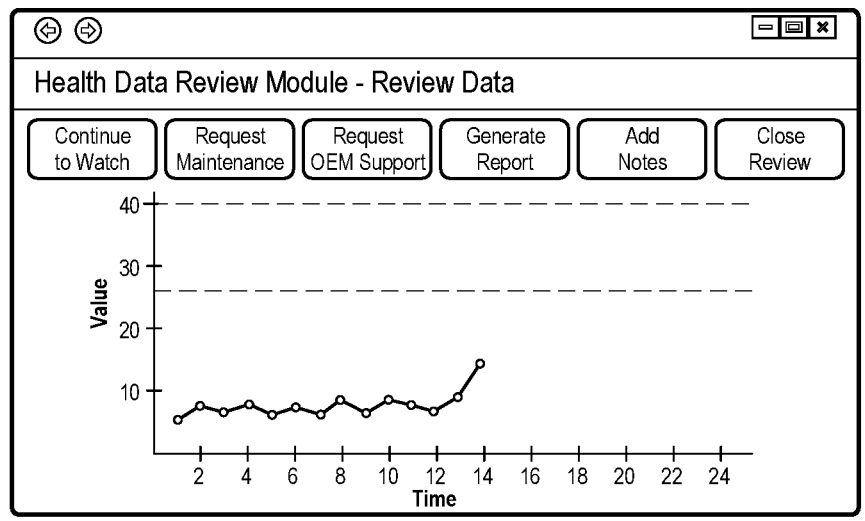
FIGS. 6A-6D are Health Data Review Module webpages displaying Review Data graphical user interfaces relating to a Review Item in accordance with embodiments of the present disclosure.

The Review Task remains available for review until a data analyst reviews the Review Item as indicated in decision block 44. For example, as best seen in FIG. 6A, health data review module 30 is operable to generate a graphical user interface relating to the Review Item such that the data analyst can analyze the health data of the aircraft component and make a determination regarding the appropriate next step. If the data analyst does not believe the health data of the aircraft component requires addition monitoring, the data analyst can select the Close Review button to close the Review Item, as indicated in decision block 46, in which case the process relating to the review of health data of the aircraft component is complete, as indicated by end block 38. In the present example, however, after analysis of the Review Item, the data analyst decides the health data of the aircraft component requires addition monitoring and selects the Continue to Watch button, as best seen in FIG. 6A. Responsive thereto, health data review module 30 sets the data review state of the Review Item to Watch Data, as indicated in block 48. The data review state remains Watch Data until new data is received from HUMS servers and databases 22, for example, after additional flight time is logged by the aircraft including the aircraft component under review, as indicated in decision block 50.

Figure 6B:
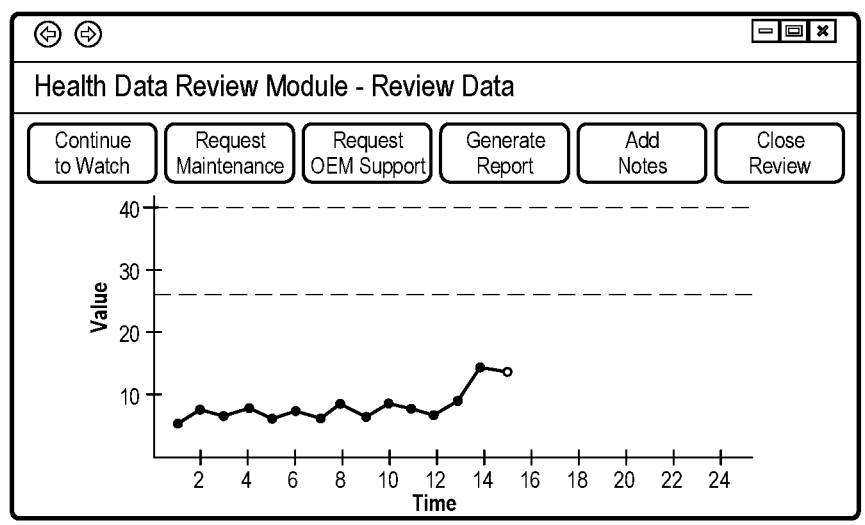

When new data is received from HUMS servers and databases 22, the process returns to block 40 where the data review state of the Review Item is set to New Data and health data review module 30 generates a Review Task, which is available for a data analyst, as indicated in block 42. The Review Task remains available for review until a data analyst reviews the Review Item as indicated in decision block 44. For example, as best seen in FIG. 6B, health data review module 30 generates a new graphical user interface relating to the Review Item with the previously reviewed health data indicated with solid indicia (Days 1-14) and the New Data indicated with open indicia (Day 15). If the data analyst does not believe the health data of the aircraft component requires addition monitoring, the data analyst can select the Close Review button to close the Review Item, as indicated in decision block 46, in which case the process relating to the review of health data of the aircraft component is complete, as indicated by end block 38. In the present example, however, after analysis of the Review Item, the data analyst decides the health data of the aircraft component should continue to be monitored and selects the Continue to Watch button, as best seen in FIG. 6B. Responsive thereto, health data review module 30 sets the data review state of the Review Item to Watch Data, as indicated in block 48. The data review state remains Watch Data until new data is received from HUMS servers and databases 22, as indicated in decision block 50.

Figure 6C:
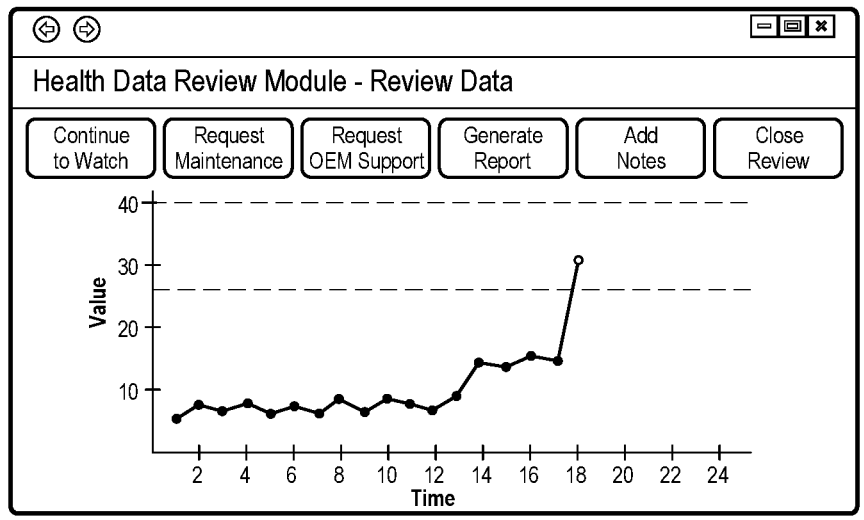

As best seen in FIG. 6C, the process of receiving New Data relating to the Review Item, setting the data review state of the Review Item to New Data, generating a Review Task, analyzing the Review Item, selecting the Continue to Watch button and resetting the data review state of the Review Item to Watch Data repeats for the New Data received on Days 15-17. Upon analysis of the New Data received on Day 18, however, the data analyst now believes addition action is required. For example, the data analyst could request an inspection of the aircraft component under review by selecting the Request Maintenance button, request information from the aircraft OEM by selecting the Request OEM Support button or generate a report by selecting the Generate Report button. When selecting certain actions such as Request Maintenance or Request OEM Support, for example, the Review Item may be assigned a category to aid the data analyst in filtering and sorting pending Review Items by a particular attribute. For example, a data analyst may want to see all Review Items that are pending OEM response or waiting on maintenance verification. These filters may be deployed in a search tool within health data review module 30 or may be provided in a category list or menu viewable on health data review module 30 webpages. Reports generated in health data review module 30 may include component, aircraft and/or fleet history reports relating to how often data is reviewed, who reviewed data and duration of Review Items from selection to closing, as well as reports relating to frequency of component, system and/or aircraft reviews, Review Items successfully addressed by initial maintenance and the time period for closing a Review Item after such maintenance, system validations to determine how condition indicators correlate to actual aircraft defects and similar reports that can help data analysts and their managers better use HUMS data.

Returning to the present example, the data analyst decides the request an inspection of the aircraft component under review by selecting the Request Maintenance button. In addition, the data analyst decides to make a note relating to the maintenance request by selecting the Add Notes button. The data analyst then selects the Continue to Watch button such that health data review module 30 sets the data review state of the Review Item to Watch Data, as indicated in block 48. The data review state remains Watch Data until new data is received from HUMS servers and databases 22, as indicated in decision block 50. The Request Maintenance operation and feedback loop may be implemented in a maintenance management module integrated in health data monitoring computing system 26 and/or health and usage monitoring system 14 or may be implemented as an independent system that is either automated or manual. In any of these implementations, findings from inspections, maintenance actions taken and other relevant information are preferably provided to health data review module 30 such that the data analyst subsequently reviewing the Review Item will be informed of the maintenance status.

Figure 6D:
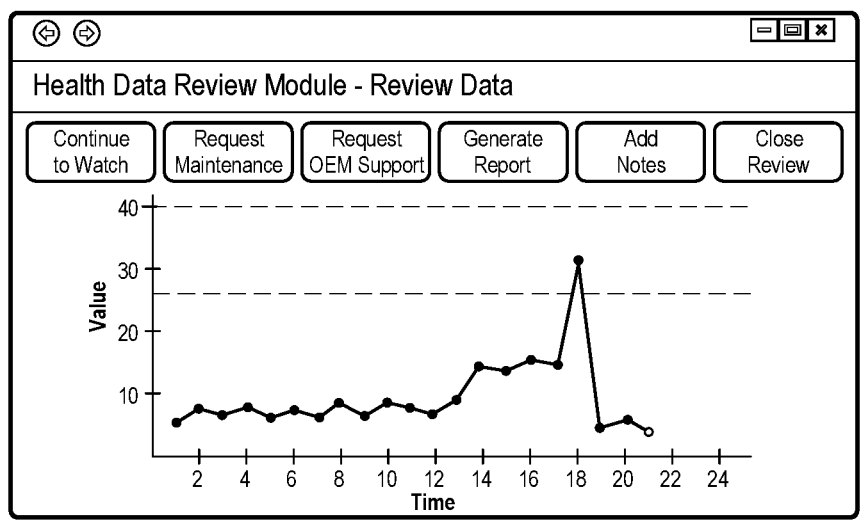

As best seen in FIG. 6D, following maintenance being performed on the aircraft component under review, the condition indicator relating to this component has returned to its desired level as indicated by the data from Days 19-20, which has been previously reviewed in the illustrated example and the data from Day 21, which is depicted as New Data. At this point, the data analyst believes the defect with the component under review has been resolved and the Review Item should be closed. Accordingly, the data analyst selects the Close Review button to close the Review Item, as indicated in decision block 46, such that the process relating to the review of health data of the aircraft component is complete, as indicated by end block 38.

Figure 7:
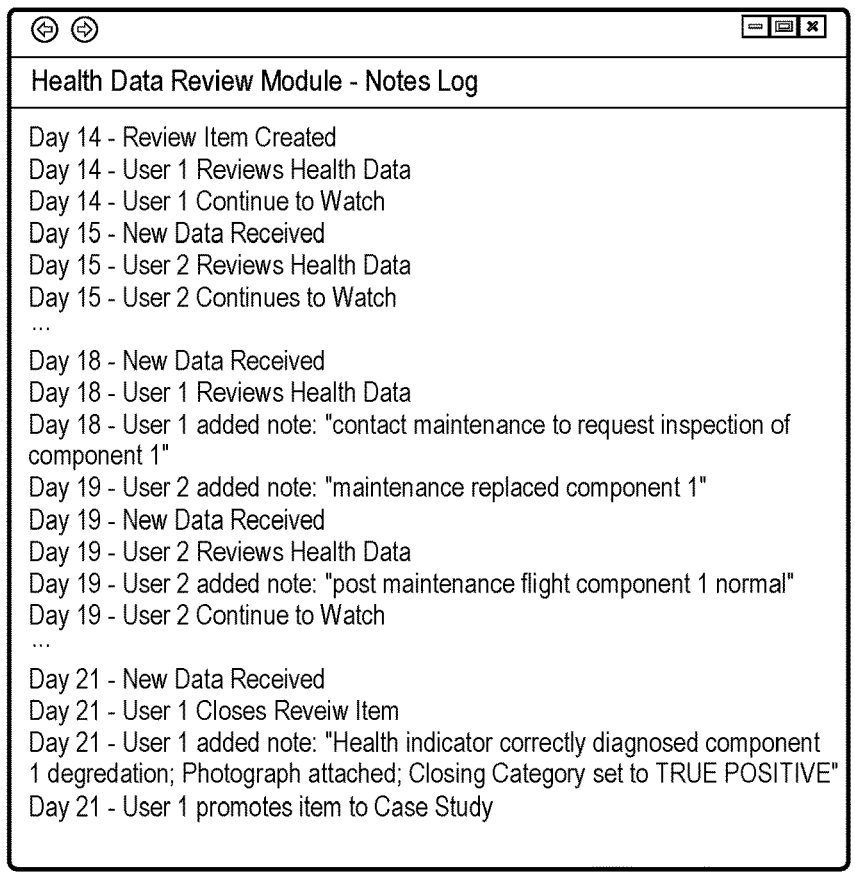
FIG. 7 is a Health Data Review Module webpage displaying a Notes Log relating to a Review Item in accordance with embodiments of the present disclosure.

Throughout the monitoring process associated with a Review Item, health data review module 30 maintains a log associated with the action taken during the review process. As best seen in FIG. 7, health data review module 30 is operable to generate a Notes Log detailing the review process. For example, on Days 14-15, the Notes Log shows the following activity: Review Item Created; User 1 Reviews Health Data; User 1 Continue to Watch; New Data Received; User 2 Reviews Health Data and User 2 Continue to Watch. Importantly, the Notes Log maintains not only information relating to the action taken but also which data analyst made which decisions. This feature of health data review module 30 enables efficient auditing of workflow and decision making by data analysts as part of their overall evaluation as data analysts. In addition, the Notes Logs chronicles the maintenance process associated with the component under review on Days 18-19 as follows: New Data Received; User 1 Reviews Health Data; User 1 added note: "contact maintenance to request inspection of component 1"; User 2 added note: "maintenance replaced component 1"; New Data Received; User 2 Reviews Health Data; User 2 added note: "post maintenance flight component 1 normal"; and User 2 Continue to Watch. The information from the Notes Log relating to the maintenance activity can used in reports or other post mortem analysis of the Review Item. The Notes Log also makes a record of the activity associated with closing the Review Item on Day 21 as follows: New Data Received; User 1 Closes Review Item; User 1 added note: "Health indicator correctly diagnosed component 1 degradation; Photograph attached; Closing Category set to TRUE POSITIVE"; and User 1 promotes item to Case Study.

Figure 8:
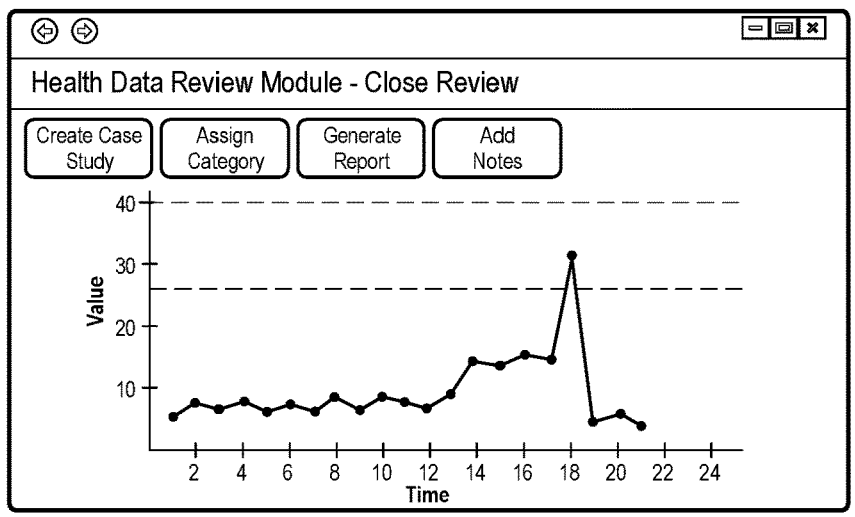
FIG. 8 is a Health Data Review Module webpage displaying a Close Review graphical user interface relating to a Review Item in accordance with embodiments of the present disclosure.
Figure 9:
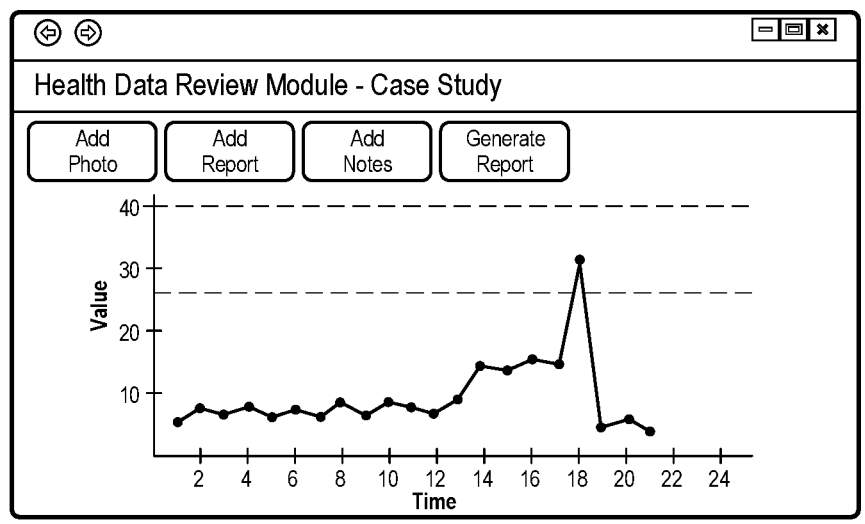
FIG. 9 is a Health Data Review Module webpage displaying a Case Study graphical user interface relating to a Review Item in accordance with embodiments of the present disclosure.

As suggest by the Notes Log and as best seen in FIG. 8, upon selecting the Close Review button to close a Review Item, health data review module 30 presents the data analyst with a graphical user interface for selecting post review activities. For example, if the handling of a particular Review Item could serve to benefit subsequent review processes, the data analyst may promote the Review Item to a Case Study by selecting the Create Case Study button. The Case Study page will then be instantiated enabling the data analyst to add photos, reports, notes or other material that may be relevant to the Review Item and the resolution of the defect associated therewith, as best seen in FIG. 9.

Figure 10:
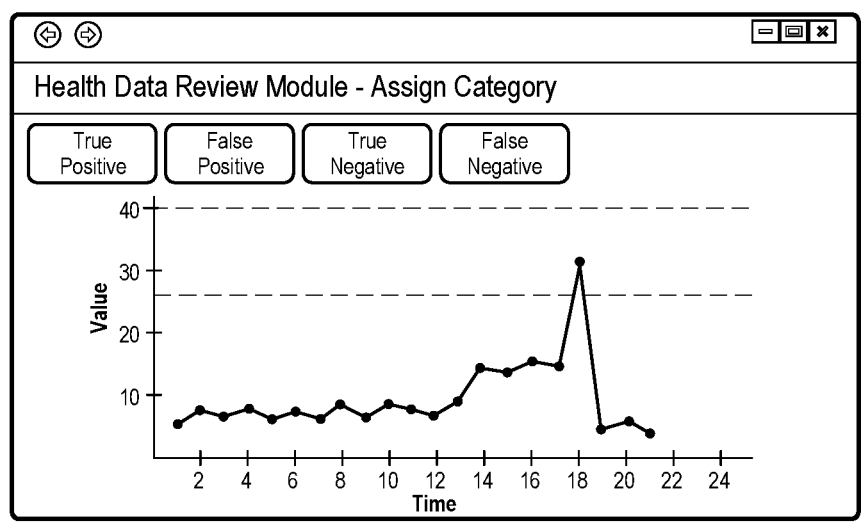
FIG. 10 is a Health Data Review Module webpage displaying an Assign Category graphical user interface relating to a Review Item in accordance with embodiments of the present disclosure.

In addition, as best seen in FIG. 8, health data review module 30 includes a feedback system that allows the data analyst the assign a closing category to the Review Item by selecting the Assign Category button. The Assign Category page will then be instantiated enabling the data analyst to select a closing category based upon the Review Item process. In the illustrated example, as best seen in FIG. 10, the data analyst may selected among four categories; namely, True Positive, False Positive, True Negative and False Negative. Use of the closing categories enables system users to determine where system deficiencies may reside. For example, if over time numerous False Positive closing category designations are associated with the same type of aircraft component on the same type of aircraft, this may point to a validity issue with the condition indicators provided by the health and usage monitoring system such as a flaw in the sensors obtaining data relating to that aircraft component in that type of aircraft. Similarly, if over time numerous True Positive closing category designations are associated with the same type of aircraft component on the same type of aircraft, this may be an indication that a fleet level problem may exist relating to that aircraft component and fleet level inspection or maintenance may be desirable.

Embodiments of methods, systems and program products of the present disclosure have been described herein with reference to drawings. While the drawings illustrate certain details of specific embodiments that implement the methods, systems and program products of the present disclosure, the drawings should not be construed as imposing on the disclosure any limitations that may be present in the drawings. The embodiments described above contemplate methods, systems and program products stored on any non-transitory machine-readable storage media for accomplishing its operations. The embodiments may be implemented using an existing computer processor or by a special purpose computer processor incorporated for this or another purpose or by a hardwired system.

Certain embodiments can include program products comprising non-transitory machine-readable storage media for carrying or having machine-executable instructions or data structures stored thereon. Such machine-readable media may be any available media that may be accessed by a general purpose or special purpose computer or other machine with a processor. By way of example, such machine-readable storage media may comprise RAM, ROM, EPROM, EEPROM, CD-ROM or other optical disk storage, magnetic disk storage or other magnetic storage devices, or any other medium which may be used to carry or store desired program code in the form of machine-executable instructions or data structures and which may be accessed by a general purpose or special purpose computer or other machine with a processor. Combinations of the above are also included within the scope of machine-readable media. Machine-executable instructions comprise, for example, instructions and data which cause a general purpose computer, special purpose computer or special purpose processing machines to perform a certain function or group of functions.

Embodiments of the present disclosure have been described in the general context of method steps which may be implemented in one embodiment by a program product including machine-executable instructions, such as program code, for example in the form of program modules executed by machines in networked environments. Generally, program modules include routines, programs, logics, objects, components, data structures, and the like that perform particular tasks or implement particular abstract data types. Machine-executable instructions, associated data structures and program modules represent examples of program code for executing steps of the methods disclosed herein. The particular sequence of such executable instructions or associated data structures represents examples of corresponding acts for implementing the functions described in such steps.

Embodiments of the present disclosure may be practiced in a networked environment using logical connections to one or more remote computers having processors. Those skilled in the art will appreciate that such network computing environments may encompass many types of computers, including personal computers, hand-held devices, multi-processor systems, microprocessor-based or programmable consumer electronics, network PCs, minicomputers, mainframe computers, and so on. Embodiments of the disclosure may also be practiced in distributed computing environments where tasks are performed by local and remote processing devices that are linked through a communications network including hardwired links, wireless links and/or combinations thereof. In a distributed computing environment, program modules may be located in both local and remote memory storage devices.

An exemplary implementation of embodiments of methods, systems and program products disclosed herein might include general purpose computing computers in the form of computers, including a processing unit, a system memory or database, and a system bus that couples various system components including the system memory to the processing unit. The database or system memory may include read only memory (ROM) and random access memory (RAM). The database may also include a magnetic hard disk drive for reading from and writing to a magnetic hard disk, a magnetic disk drive for reading from or writing to a removable magnetic disk and an optical disk drive for reading from or writing to a removable optical disk such as a CD ROM or other optical media. The drives and their associated machine-readable media provide nonvolatile storage of machine-executable instructions, data structures, program modules and other data for the computer. User interfaces, as described herein may include a computer with monitor, keyboard, a keypad, a mouse, joystick or other input devices performing a similar function.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure. Such variations will depend on the software and hardware systems chosen and on designer choice. It is understood that all such variations are within the scope of the present disclosure. Likewise, software and web implementations of the present disclosure could be accomplished with standard programming techniques using rule based logic and other logic to accomplish the various processes.

The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons skilled in the art upon reference to the description. It is, therefore, intended that the appended claims encompass any such modifications or embodiments.

What is claimed is:

1. A method of task-based health data monitoring of data provided by health and usage monitoring systems and relating to aircraft components of aircraft within an aircraft fleet, the method comprising:
   (A). establishing a review item with a first data review state to create a review task relating to health data of an aircraft component of an aircraft within the aircraft fleet;
   (B). generating images relating to the review item for display on a display device;
   (C). retaining the review item for monitoring responsive to receiving user input changing the first data review state of the review item to a second data review state;
   (D). receiving new health data relating to the aircraft component; and
   (E). automatically resetting the review item from the second data review state to the first data review state responsive to receiving the new health data to create a new review task.

2. The method as recited in claim 1 wherein establishing a review item with a first data review state to create a review task relating to health data of an aircraft component further comprises displaying a condition indicator relating to the aircraft component on the display device and receiving user input to establish the review item.

3. The method as recited in claim 1 wherein establishing a review item with a first data review state to create a review task relating to health data of an aircraft component further comprises automatically establishing the review item based upon a condition indicator for the aircraft component deviating from a desired level.

4. The method as recited in claim 1 wherein establishing a review item with a first data review state to create a review task relating to health data of an aircraft component further comprises automatically establishing the review item based upon a condition indicator for the aircraft component having an undesired indicator trend selected from the group consisting of rate of change, step change, data spike and change in scatter.

5. The method as recited in claim 1 further comprises generating a maintenance request for the aircraft component and performing maintenance on the aircraft component based upon the review task.

6. The method as recited in claim 5 wherein receiving new health data relating to the aircraft component occurs after maintenance is performed on the aircraft component responsive to the maintenance request.

7. The method as recited in claim 1 further comprising repeating steps (B), (C), (D) and (E) until closing the review item.

8. The method as recited in claim 7 wherein closing the review item further comprises assigning a closing category to the review item.

9. The method as recited in claim 8 further comprising using closing category data to validate condition indicators.

10. A system for task-based health data monitoring of data provided by a health and usage monitoring systems and relating to aircraft components of aircraft within an aircraft fleet, the system comprising:
    a health data monitoring computing system having logic stored within a non-transitory computer readable medium, the logic executable by a processor, wherein the health data monitoring computer system is configured to:
    (A). establish a review item with a first data review state to create a review task relating to health data of an aircraft component of an aircraft within the aircraft fleet;
    (B). generate images relating to the review item for display on a display device;
    (C). retain the review item for monitoring responsive to receiving user input changing the first data review state of the review item to a second data review state;
    (D). receive new health data relating to the aircraft component; and
    (E). automatically reset the review item from the second data review state to the first data review state responsive to receiving the new health data to create a new review task.

11. The system as recited in claim 10 wherein the health data monitoring computer system is configured to display a condition indicator relating to the aircraft component on the display device and receive user input to establish the review item.

12. The system as recited in claim 10 wherein the health data monitoring computer system is configured to automatically establish the review item based upon a condition indicator relating to the aircraft component deviating from a desired level.

13. The system as recited in claim 10 wherein the health data monitoring computer system is configured to repeat items (B), (C), (D) and (E) until receiving an indication to close the review item.

14. The system as recited in claim 10 wherein the health data monitoring computer system is configured to use closing category data to validate condition indicators.

15. A non-transitory computer readable storage medium comprising a set of computer instructions executable by a processor for operating a computing system for task-based health data monitoring of data provided by health and usage monitoring systems and relating to aircraft components of aircraft within an aircraft fleet, the computer instructions configured to:
  (A). establish a review item with a first data review state to create a review task relating to health data of an aircraft component of an aircraft within the aircraft fleet;
  (B). generate images relating to the review item for display on a display device;
  (C). retain the review item for monitoring responsive to receiving user input changing the first data review state of the review item to a second data review state;
  (D). receive new health data relating to the aircraft component; and
  (E). automatically reset the review item from the second data review state to the first data review state responsive to receiving the new health data to create a new review task.

16. The non-transitory computer readable storage medium as recited in claim 15 wherein the computer instructions are configured to display a condition indicator relating to the aircraft component on the display device and receive user input to establish the review item.

17. The non-transitory computer readable storage medium as recited in claim 15 wherein the computer instructions are configured to automatically establish the review item based upon a condition indicator relating to the aircraft component deviating from a desired level.

18. The non-transitory computer readable storage medium as recited in claim 15 wherein the computer instructions are configured to repeat items (B), (C), (D) and (E) until receiving an indication to close the review item.

19. The non-transitory computer readable storage medium as recited in claim 15 wherein the computer instructions are configured to use closing category data to validate condition indicators.

* * * * *